United States Patent
Liu et al.

(10) Patent No.: US 8,780,287 B2
(45) Date of Patent: Jul. 15, 2014

(54) ELECTRICALLY-DRIVEN LIQUID CRYSTAL LENS PANEL AND STEREOSCOPIC DISPLAY PANEL

(75) Inventors: Sheng-Chi Liu, New Taipei (TW); Yung-Sheng Tsai, Hsinchu County (TW); Jen-Lang Tung, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 190 days.

(21) Appl. No.: 13/602,342

(22) Filed: Sep. 4, 2012

(65) Prior Publication Data
US 2013/0314627 A1   Nov. 28, 2013

(30) Foreign Application Priority Data
May 23, 2012   (TW) .............................. 101118344 A (51) Int. Cl.
*G02F 1/1335* (2006.01)

(52) U.S. Cl.
USPC .......................................................... 349/15

(58) Field of Classification Search
CPC .................................................. G02B 27/2214
USPC .............................................................. 349/15
See application file for complete search history.

(56) References Cited

U.S. PATENT DOCUMENTS

| | | | |
|---|---|---|---|
| 8,120,647 B2 * | 2/2012 | Soh ................................ | 348/51 |
| 8,373,808 B2 * | 2/2013 | Owaku et al. ................... | 349/15 |
| 8,659,586 B2 * | 2/2014 | Kadowaki ....................... | 345/208 |
| 2010/0259697 A1 | 10/2010 | Sakamoto et al. | |
| 2010/0309296 A1 | 12/2010 | Harrold et al. | |
| 2011/0032438 A1 | 2/2011 | Yun et al. | |
| 2012/0013606 A1 * | 1/2012 | Tsai et al. ...................... | 345/419 |
| 2012/0105748 A1 * | 5/2012 | Huang et al. ................... | 349/15 |

* cited by examiner

*Primary Examiner* — James Dudek
(74) *Attorney, Agent, or Firm* — Jianq Chyun IP Office (57) ABSTRACT

An electrically-driven liquid crystal lens panel includes a pair of substrates, a liquid crystal layer, alignment layers, and electrode layers. The electrode layer is disposed between the alignment layer and the substrate, has effective and non-effective regions, and includes electrodes. Each electrode has main and extending portions and a turning point, wherein the turning points are disposed at sites at which the main portions and the extending portions connect, the main portions extends along a first extending direction, and each extending portion extends along a second extending direction different from the first extending direction. The second extending direction is substantially parallel to an alignment direction of the alignment layer. A connecting line formed by connecting the turning points is a boundary between the effective region and the non-effective region, wherein the main portions are disposed in the effective region, and the extending portions are disposed in the non-effective region.

15 Claims, 8 Drawing Sheets

ELECTRICALLY-DRIVEN LIQUID CRYSTAL LENS PANEL AND STEREOSCOPIC DISPLAY PANEL

CROSS-REFERENCE TO RELATED APPLICATION

This application claims the priority benefit of Taiwan Application Serial Number 101118344, filed on May 23, 2012. The entirety of the above-mentioned patent application is hereby incorporated by reference herein and made a part of this specification.

TECHNICAL FIELD

The disclosure relates to a panel, and more particularly relates to an electrically-driven liquid crystal lens panel and a stereoscopic display panel.

BACKGROUND

In recent years, continuous advancement of display technologies results in increasing requirements of users on display quality of display devices (such as image resolution, color saturation, etc.). However, besides high image resolution and high color saturation, in order to satisfy the needs of users of viewing realistic images, display devices that display stereoscopic images are also developed.

The current stereoscopic techniques can be classified into auto-stereoscopic techniques, with which viewers can view stereoscopic images with naked eyes, and stereoscopic techniques, with which viewers have to wear specifically-designed glasses to view stereoscopic images. The working principle of auto-stereoscopic display techniques is primarily to control images captured by the left and right eyes of the viewers with parallax barrier, column lens array, liquid crystal lens, and so on. According to the visual characteristics of human eyes, when the images captured by the left and right eyes respectively have different parallax, human eyes overlap the two images and interpret them as one stereoscopic image. The working principle of stereoscopic display techniques is to display images for the left and right eyes with a display panel and form a stereoscopic vision by making the left and right eyes receive the images for left and right eyes respectively through wearing the head-mounted glasses.

In a liquid crystal lens stereoscopic display device, liquid crystal molecules in a liquid crystal layer are driven by the electric field distributed in the liquid crystal layer, direction of the long axis of the liquid crystal molecules are changed along with strength undulation of the electric field, and thus the liquid crystal molecules provide a refractive index distribution similar to that of a lens. Since a liquid crystal lens is capable of zooming, it is extensively applied to stereoscopic display devices as a switching device between plane and stereoscopic display. However, the deflection of liquid crystal molecules may be influenced by electrode configuration and driving method of voltage. For example, the interior liquid crystal molecules are easily influenced by the electric fields created by a peripheral electrode to become disorderly distributed, leading to a less preferable lens effect of the liquid crystal lens.

SUMMARY

The disclosure provides an electrically-driven liquid crystal lens panel having a preferable lens effect.

The disclosure also provides a stereoscopic display panel having a preferable display quality.

The disclosure provides an electrically-driven liquid crystal lens panel, including a first substrate, a second substrate, a liquid crystal layer, a first alignment layer, a first electrode layer, a second alignment layer, and a second electrode layer. The second substrate is disposed opposite to the first substrate, and the liquid crystal layer is disposed between the first substrate and the second substrate. The first alignment layer is disposed between the first substrate and the liquid crystal layer, and the first alignment layer has a first alignment direction to align liquid crystal molecules of the liquid crystal layer. The first electrode layer is disposed between the first alignment layer and the first substrate, and has a first effective region and a first non-effective region. The first electrode layer includes at least two first electrodes, each of the first electrodes having a first main portion, a first extending portion and a first turning point. The first turning points are located at sites at which the first main portions and the first extending portions connect. The first main portions extend along a first extending direction, and the first main portions are substantially parallel to each other. Each of the first extending portions extends along a second extending direction, the second extending direction being different from the first extending direction and substantially parallel to the first alignment direction, wherein a first connecting line formed by connecting the first turning points is a boundary between the first effective region and the first non-effective region. The first main portions are located in the first effective region, and the first extending portions are located in the first non-effective region. The second alignment layer is disposed between the second substrate and the liquid crystal layer. The second electrode layer is disposed between the second alignment layer and the second substrate.

The disclosure provides a stereoscopic display panel, including a display panel and an electrically-driven liquid crystal lens panel. The display panel has a display region and a peripheral region. The electrically-driven liquid crystal lens panel is disposed on one side of the display panel and include a first substrate, a second substrate, a liquid crystal layer, a first alignment layer, a first electrode layer, a second alignment layer, and a second electrode layer. The second substrate is disposed opposite to the first substrate, and the liquid crystal layer is disposed between the first substrate and the second substrate. The first alignment layer is disposed between the first substrate and the liquid crystal layer, and the first alignment layer has a first alignment direction to align liquid crystal molecules of the liquid crystal layer. The first electrode layer is disposed between the first alignment layer and the first substrate, and has a first effective region and a first non-effective region. The first electrode layer includes at least two first electrodes, each of the first electrodes having a first main portion, a first extending portion and a first turning point. The first turning points are located at sites at which the first main portions and the first extending portions connect. The first main portions extend along a first extending direction, and the first main portions are parallel to each other. The first extending portions extend along a second extending direction, the second extending direction being different from the first extending direction and substantially parallel to the first alignment direction, wherein a first connecting line formed by connecting the first turning points is a boundary between the first effective region and the first non-effective region. The first main portions are located in the first effective region, and the first extending portions are located in the first non-effective region, wherein the first effective region is disposed correspondingly with the display region, and the first non-effective region is disposed correspondingly with the peripheral region. The second alignment layer is disposed between the second substrate and the liquid crystal layer. The second electrode layer is disposed between the second alignment layer and the second substrate.

In light of the above, in the electrically-driven liquid crystal lens panel of the disclosure, the extending direction of the extending portions of the electrodes is configured to be substantially identical as the alignment direction of the alignment layer, in order to prevent a peripheral electrode from influencing the distribution of an interior liquid crystal, making the liquid crystal layer have a desired distribution of refractive index. Accordingly, the electrically-driven liquid crystal lens panel has a preferable lens effect, and the stereoscopic display panel that adopts the electrically-driven liquid crystal lens panel has a better display quality.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
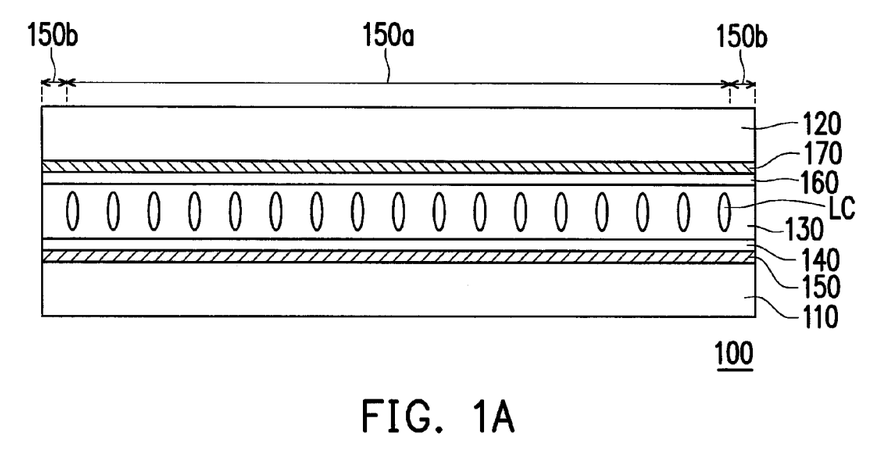
FIG. 1A is a schematic cross-sectional diagram of an electrically-driven liquid crystal lens panel according to an embodiment of the disclosure.

FIG. 1A is a schematic cross-sectional diagram of an electrically-driven liquid crystal lens panel according to an embodiment of the disclosure. Referring to FIG. 1A, an electrically-driven liquid crystal lens panel 100 includes a first substrate 110, a second substrate 120, a liquid crystal layer 130, a first alignment layer 140, a first electrode layer 150, a second alignment layer 160 and a second electrode layer 170.

The second substrate 120 is disposed opposite to the first substrate 110. The liquid crystal layer 130 is disposed between the first substrate 110 and the second substrate 120. In the embodiment, the first substrate 110 and the second substrate 120 are made of a glass substrate or quartz, for example. In other embodiments, the first substrate 110 and the second substrate 120 may adopt a transparent substrate of other materials, such as a polymeric material. The liquid crystal layer includes a plurality of liquid crystal molecules LC, wherein the liquid crystal molecules LC have optical anisotropy within an electric field and have optical isotropy without an electric field.

The first alignment layer 140 is disposed between the first substrate 110 and the liquid crystal layer 130, and the first alignment layer 140 has a first alignment direction P1 to align the liquid crystal molecules LC in the liquid crystal layer 130. The second alignment layer 160 is disposed between the second substrate 120 and the liquid crystal layer 130. An alignment direction of the second alignment layer 160 is preferred to be substantially parallel to the alignment direction of the first alignment layer 140. In the embodiment, a material of the first alignment layer 140 and the second alignment layer 160 includes, for example, polyimide (PI), methyl cellulose (MC), polymethylmethacrylate (PMMA), polyvinyl alcohol (PVA), polyamide, silicon oxide ($SiO_2$), silicon nitride, silicon carbonate, or aluminum oxide that is insulating, etc.

Figure 1B:
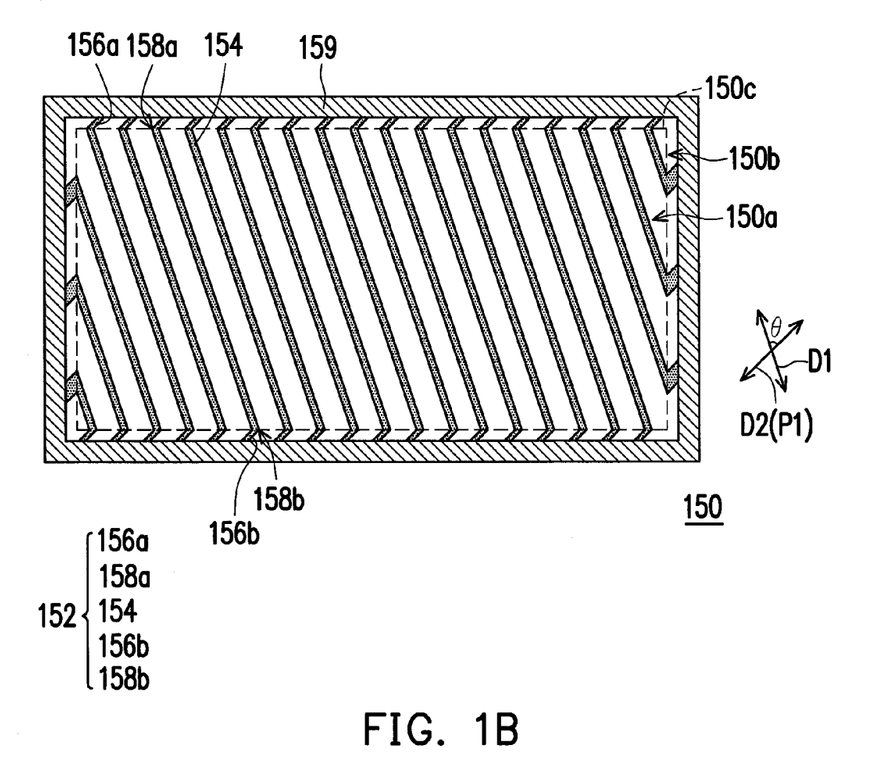
FIG. 1B is a top-view schematic diagram of a first electrode layer in FIG. 1A.

Referring to FIGS. 1A and 1B simultaneously, the first electrode layer 150 is disposed between the first alignment layer 140 and the first substrate 110, having a first effective region 150a and a first non-effective region 150b. The first effective region 150a is, for example, a central region, the first non-effective region 150b is, for example, a peripheral region, and the first non-effective region 150b, for example, surrounds the first effective region 150a. At least one of the first electrode layer 150 and the second electrode layer 170 has an electrode pattern. That is, there are three kinds of designs as follows. First, the first electrode layer 150 has the electrode pattern, while the second electrode layer 170 does not have an electrode pattern (or alternatively called a plate electrode). Second, the second electrode layer 170 has the electrode pattern, while the first electrode layer 150 does not have an electrode pattern (or alternatively called a plate electrode). Third, the first electrode layer 150 and the second electrode layer 170 both have the electrode pattern.

The first and second designs, having either the first electrode layer 150 or the second electrode layer 170 with an electrode pattern, are embodiments of the disclosure. However, considering primarily the relative ease in design and convenience in manufacture, the embodiment of the disclosure takes the first electrode layer 150 having electrode patterns as a preferred example, but the disclosure is not limited thereto. Therefore, the first electrode layer 150 includes at least two first electrodes 152, and each of the first electrodes 152 has a first main portion 154, a first extending portion 156a and a first turning point 158a.

The first turning points 158a are located at sites at which the first main portions 154 and the first extending portions 156a connect. The first main portions 154 extend along a first extending direction D1, and the first main portions 154 are substantially parallel to each other. Each of the first extending portions 156a extends along a second extending direction D2, the second extending direction D2 being different from the first extending direction D1 and substantially parallel to the first alignment direction P1. In the embodiment, the first main portion 154 and the first extending portion 156a are conducting wires, for example, wherein a first connecting line 150c formed by connecting the first turning points 158a is a boundary between the first effective region 150a and the first non-effective region 150b, the first main portions 154 being located in the first effective region 150a, and the first extending portions 156a being located in the first non-effective region 150b. In the embodiment, there is an included angle θ between the first extending direction D1 of each of the first electrodes 152 and the first alignment direction P1, and each of the included angles θ is substantially identical. Each of the included angles θ is, for example, substantially between 45° and 135°, preferably between, for example, substantially between 45° and 90° or substantially between 90° and 135°, and more preferably between, for example, substantially between 60° and 70° or substantially between 100° and 115°. The embodiment of the disclosure is exemplified with the alignment direction P1 being, for example, approximately 45 degrees, the electrode orientation of the first electrode layer 150 in the effective region 150a being, for example, approximately 108.4 degrees, and the included angle θ therebetween being approximately 63.4 degrees, but the disclosure is not limited thereto.

In the embodiment, each of the first electrodes 152 further includes a second extending portion 156b and a second turning point 158b, for example. The first extending portions 156a and the second extending portions 156b are, for example, respectively connected with one end of the first main portions 154. The second turning points 158b are located at sites at which the first main portions 154 and the second extending portions 156b connect, and each of the second extending portions 156b extends along the second extending direction D2. In other words, the first main portions 154 are, for example, located between the first extending portions 156a and the second extending portions 156b. Specifically note that, although the extending directions of the first extending portions 156a and the second extending portions 156b are substantially identical, a substantial difference between a pointing direction of the first extending portions 156a extending externally from the first turning points 158a and a pointing direction of the second extending portions 156b extending externally from the second turning points 158b is about 180°. In the embodiment, the first connecting line 150c is formed by connecting the first turning points 158a and the second turning points 158b, for example, and is configured as the boundary between the first effective region 150a and the first non-effective region 150b. The first main portions 154 are located in and define the first effective region 150a, and the first extending portions 156a and the second extending portions 156b are located in and define the first non-effective region 150b. In the embodiment, a material of the first main portions 154, the first extending portions 156a and the second extending portions 156b may be indium tin oxide (ITO), indium zinc oxide (IZO), aluminum zinc oxide (AZO), gallium zinc oxide (GZO), indium gallium oxide (IGO), indium gallium zinc oxide (IGZO), or other suitable light-transmissive conductive materials or other suitable conductive materials whose line width is not easily sensible to human eyes. Line widths of the first main portions 154, the first extending portions 156a and the second extending portions 156b are several micrometers, for example.

In the embodiment, the first electrode layer 150 further includes a first connecting electrode 159, for example, which is electrically connected to the first electrodes 152. In the embodiment, one end of the first extending portions 156a is connected with the first main portions 154, whereas another end of the first extending portions 156a is connected with the first connecting electrode 159, and one end of the second extending portions 156b is connected with the first main portions 154, whereas another end of the second extending portions 156b is connected with the first connecting electrode 159. In other words, the two ends of the first electrodes 152 are connected with the first connecting electrode 159 respectively, making the first electrodes 152 electrically connected with each other. In the embodiment, the first connecting electrode 159 is an annular electrode (or namely ring electrode, surrounding electrode), for example. However, in other embodiments, the first connecting electrode 159 may have a different configuration. For example, the first connecting electrode 159 may be connected with the first extending portions 156a of a portion of the first electrodes 152 and the second extending portions 156b of the rest of the first electrodes 152, making the first electrodes 152 electrically connected with each other. In the embodiment, a material of the first connecting electrode 159 may be a light-transmissive conductive material or a light-tight conductive material. A line width of the first connecting electrode 159 is several micrometers, for example.

Besides, in other embodiments, when the first electrode layer 150 and the second electrode layer 170 both have an electrode pattern, the electrode pattern of the second electrode layer 170 may be optionally identical to or different from the electrode pattern of the first electrode layer 150. However, to make the electrically-driven liquid crystal lens panel operate and have a lens effect no matter a stereoscopic display panel is disposed laterally (or namely landscape) or longitudinally (or namely portrait, i.e. when the display image is rotated), refer to FIG. 1B for the electrode pattern of the first electrode layer 150, whereas the electrode pattern of the second electrode layer 170 needs to be specifically designed. Therefore, referring to FIGS. 1A and 1C simultaneously, in which the second electrode layer 170 is preferably disposed between the second alignment layer 160 and the second substrate 120. The embodiment takes a configuration of the second electrode layer 170 sharing a similarity with the first electrode layer 150 for example. More specifically, the second electrode layer 170 has, for example, a second effective region 170a and a second non-effective region 170b. The second electrode layer 170 includes, for example, at least two second electrodes 172, and each of the second electrodes 172 has a second main portion 174, a third extending portion 176a and a third turning point 178a. The third turning points 178a are located at sites at which the second main portions 174 and the third extending portions 176a connect. The second main portions 174 extends along a third extending direction D3, and the second main portions 174 are substantially parallel to each other, while the third extending direction D3 is different from the first extending direction D1. Each of the third extending portions 176a extends along the second extending direction D2. In the embodiment, the third extending direction D3 and the first extending direction D1 substantially intersect, for example. In the embodiment, the second main portions 174 and the third extending portions 176a are conducting wires, for example. In the embodiment, there is an included angle θ' between the third extending direction D3 of each of the second electrodes 172 and the first alignment direction P1, and the included angles θ' are substantially identical, wherein the included angle θ' is, for example, substantially between 10° and 40°, and preferably between, for example, substantially between 15° and 35° or substantially between 20° and 30°. The embodiment takes as example that the alignment direction P1 is approximately 45 degrees, the electrode orientation of the second electrode layer 170 in the effective region 170a being approximately 18.4 degrees. Therefore the included angle θ' is approximately 26.6 degrees, but the embodiment is not limited thereto.

Figure 1C:
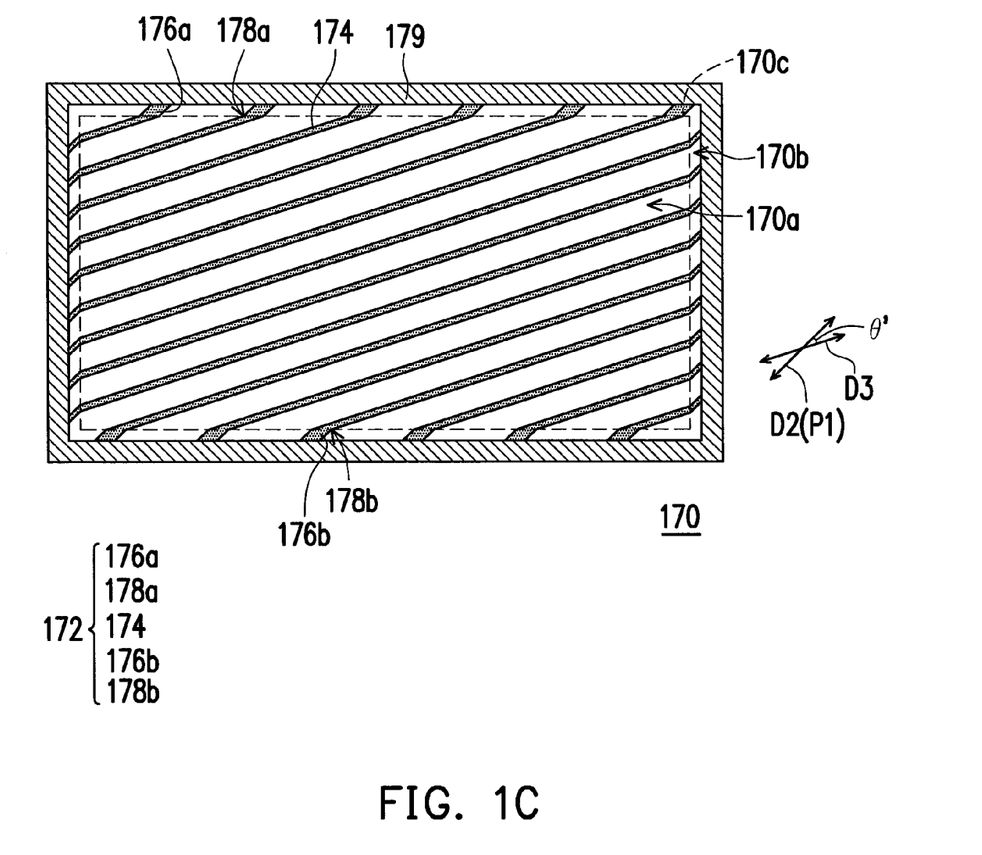
FIG. 1C is a top-view schematic diagram of a second electrode layer in FIG. 1A.

In the embodiment, a second connecting line 170c formed by connecting the third turning points 178a is a boundary between the second effective region 170a and the second non-effective region 170b. The second main portions 174 are located in the second effective region 170a, and the third extending portions 176a are located in the second non-effective region 170b. In the embodiment, the second effective region 170a is, for example, disposed correspondingly with the first effective region 150a, and the second non-effective region 170b is, for example, disposed correspondingly with the first non-effective region 150b. For instance, the second effective region 170a overlaps with the first effective region 150a, for example, and the second non-effective region 170b overlaps with the first non-effective region 150b, for example.

In the embodiment, each of the second electrodes 170 further includes a fourth extending portion 176b and a fourth turning point 178b, for example. The third extending portions 176a and the fourth extending portions 176b are connected respectively with one end of the second main portions 174, for example, and the fourth turning points 178b are located at sites at which the second main portions 174 and the fourth extending portions 176b connect, and the fourth extending portions 176b extend along the second extending direction D2. In other words, the second main portions 174 are, for example, located between the third extending portions 176a and the fourth extending portions 176b. Note specifically that although the extending direction of the third extending portions 176a and the extending direction of the fourth extending portions 176b are substantially identical, the difference between a pointing direction of the third extending portions 176a extending externally from the third turning points 178a and a pointing direction of the fourth extending portions 176b extending externally from the fourth turning points 178b is about 180°. In the embodiment, the second connecting line 170c is formed by connecting the third turning points 178a and the fourth turning points 178b, for example, and is the boundary between the second effective region 170a and the second non-effective region 170b. The second main portions 174 are located in and define the second effective region 170a, and the third extending portions 176a and the fourth extending portions 176b are located in and define the second non-effective region 170b. In the embodiment, a material of the second main portions 174, the third extending portions 176a and the fourth extending portions 176b may be, for example, AZO, GZO, IGO, IGZO, other suitable light-transmissive conductive material or other suitable conductive material whose line width is not easily sensible to human eyes. A line width of the second main portions 174, the third extending portions 176a and the fourth extending portions 176b are, for example, several micrometers.

In the embodiment, the second electrode layer 170 further includes a second connecting electrode 179 which is electrically connected with the second electrodes 172, for example. In the embodiment, one end of the third extending portions 176a is connected with the second main portions 174, another end of the third extending portions 176a is connected with the second connecting electrode 179, one end of the fourth extending portions 176b is connected with the second main portions 174, and another end of the fourth extending portions 176b is connected with the second connecting electrode 179. In other words, the two ends of the second electrodes 172 are, for example, respectively connected to the second connecting electrode 179, making the second electrodes 172 electrically connected with each other. In the embodiment, the second connecting electrode 179 is an annular electrode (or namely ring electrode, surrounding electrode), for example. However, in other embodiments, the second connecting electrode 179 may have a different configuration. For example, the second connecting electrode 179 may be connected with the third extending portions 176a which are part of the second electrodes 172, and be connected with the fourth extending portions 176b which is the rest of the second electrodes 172, making the second electrodes 172 electrically connected with each other. In the embodiment, a material of the second connecting electrode 179 may be a light-transmissive conductive material or a light-tight conductive material. A line width of the second connecting electrode 179 is several micrometers, for example.

Specifically note that since the extending direction of the first extending portions 156a and the second extending portions 156b of the first electrodes 152 is substantially identical with the alignment direction P1 of the first alignment layer 140, an influence of the first connecting electrode 159 in the peripheral region on distribution of liquid crystals correspondingly disposed in the effective region 150a is avoided, and an occurrence of disorderly distributed liquid crystals is thereby prevented. Similarly, since the extending direction of the third extending portions 176a and the fourth extending portions 176b of the second electrodes 172 is substantially identical as the alignment direction P1 of the first alignment layer 140, an influence of the second connecting electrode 179 in the peripheral region on distribution of liquid crystals correspondingly disposed in the effective region 170a is avoided, the phenomenon of disorderly distribution of liquid crystals is thereby prevented.

Figure 2A:
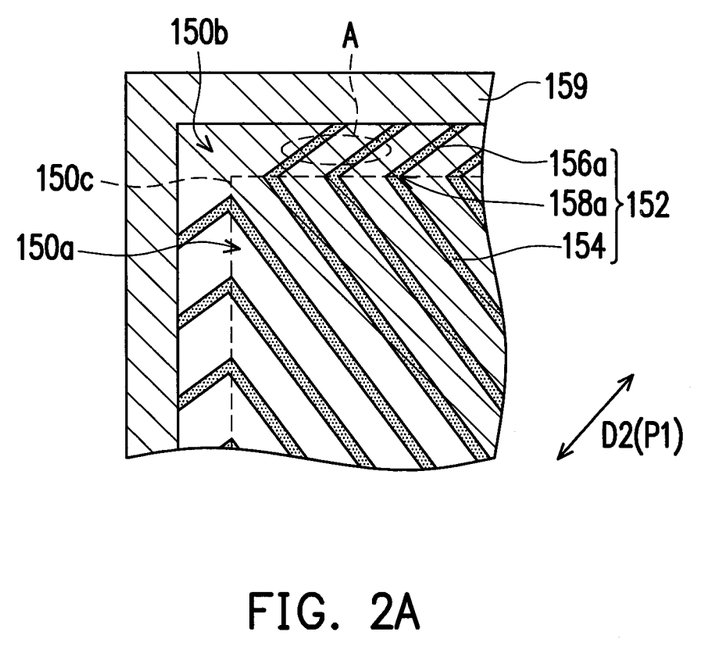
FIG. 2A is a partial schematic diagram of a first electrode in a peripheral region in FIG. 1B.
Figure 2B:
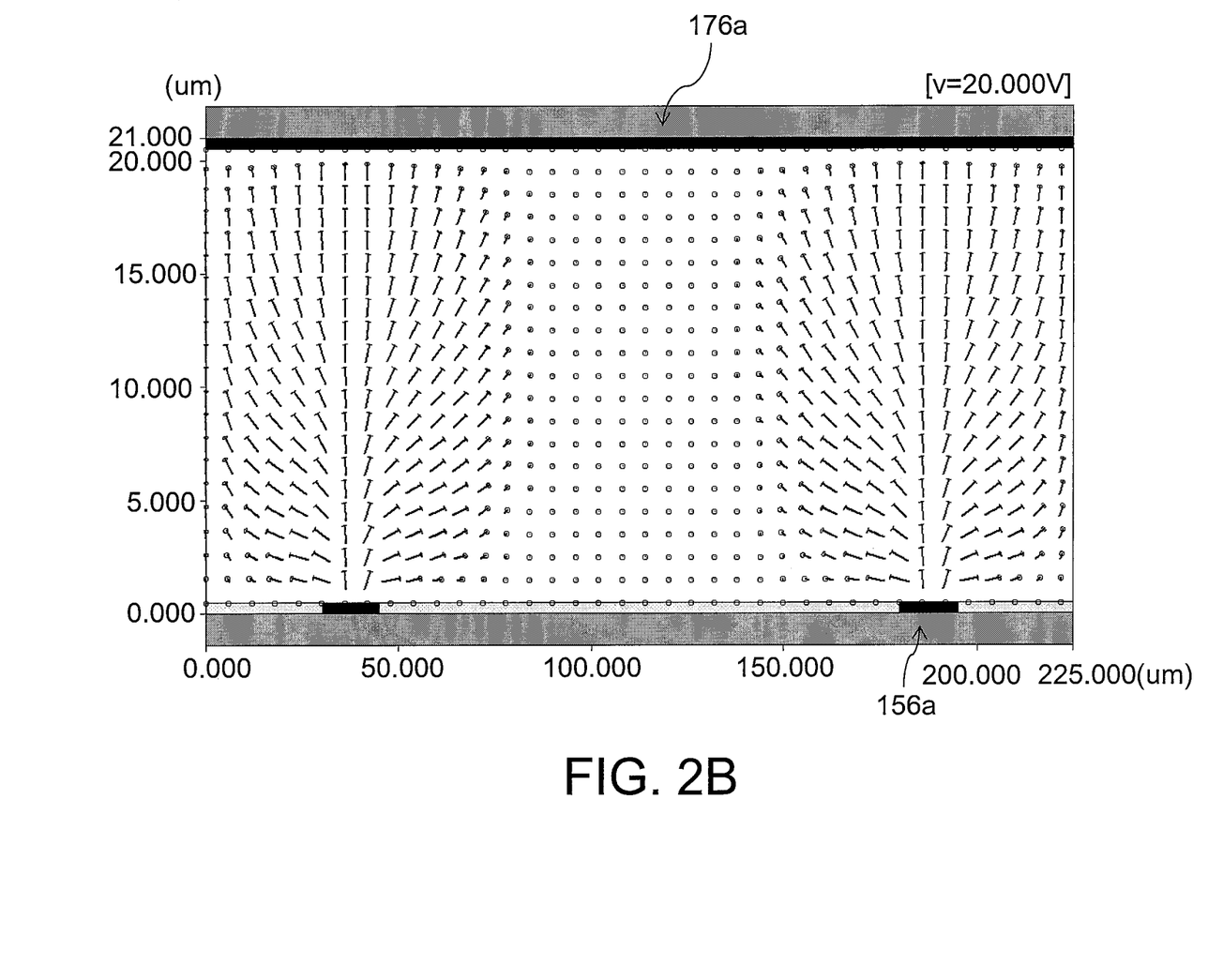
FIG. 2B is a lateral and longitudinal distributions diagram of liquid crystal molecules in a region A in FIG. 2A.
Figure 5A:
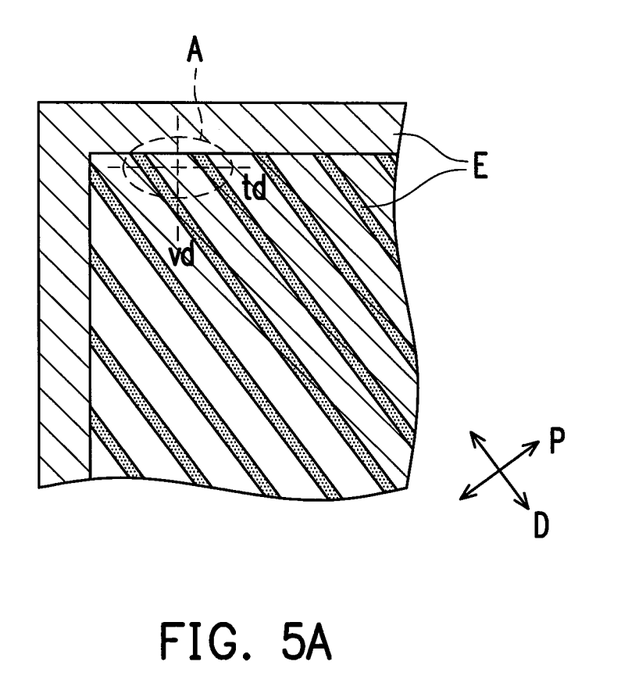
FIG. 5A is a partial schematic diagram of an electrode in a peripheral region according to a comparative example.
Figure 5B:
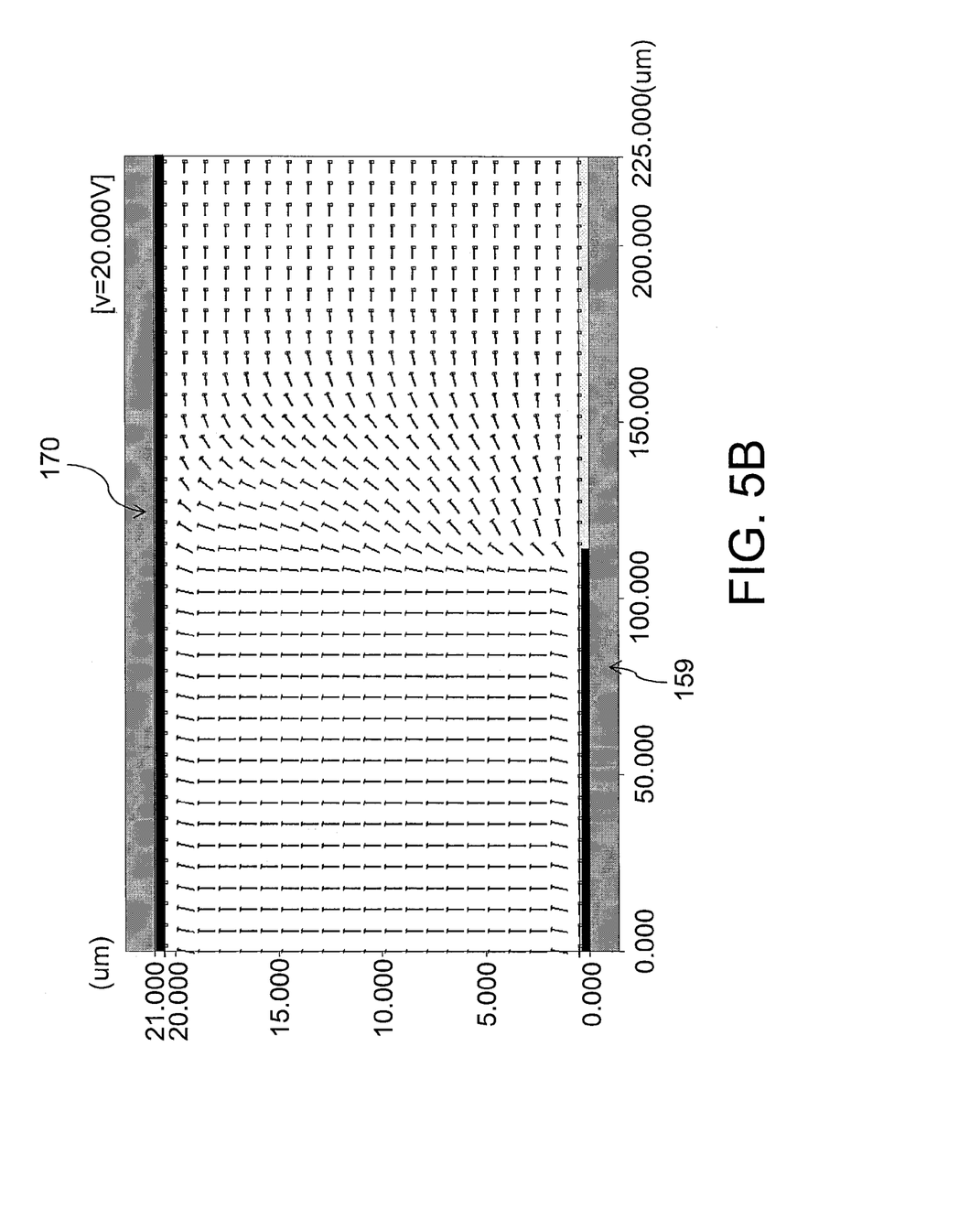
FIG. 5B is a longitudinal distribution diagram (vd direction) of liquid crystal molecules in a region A' in FIG. 5A.
Figure 5C:
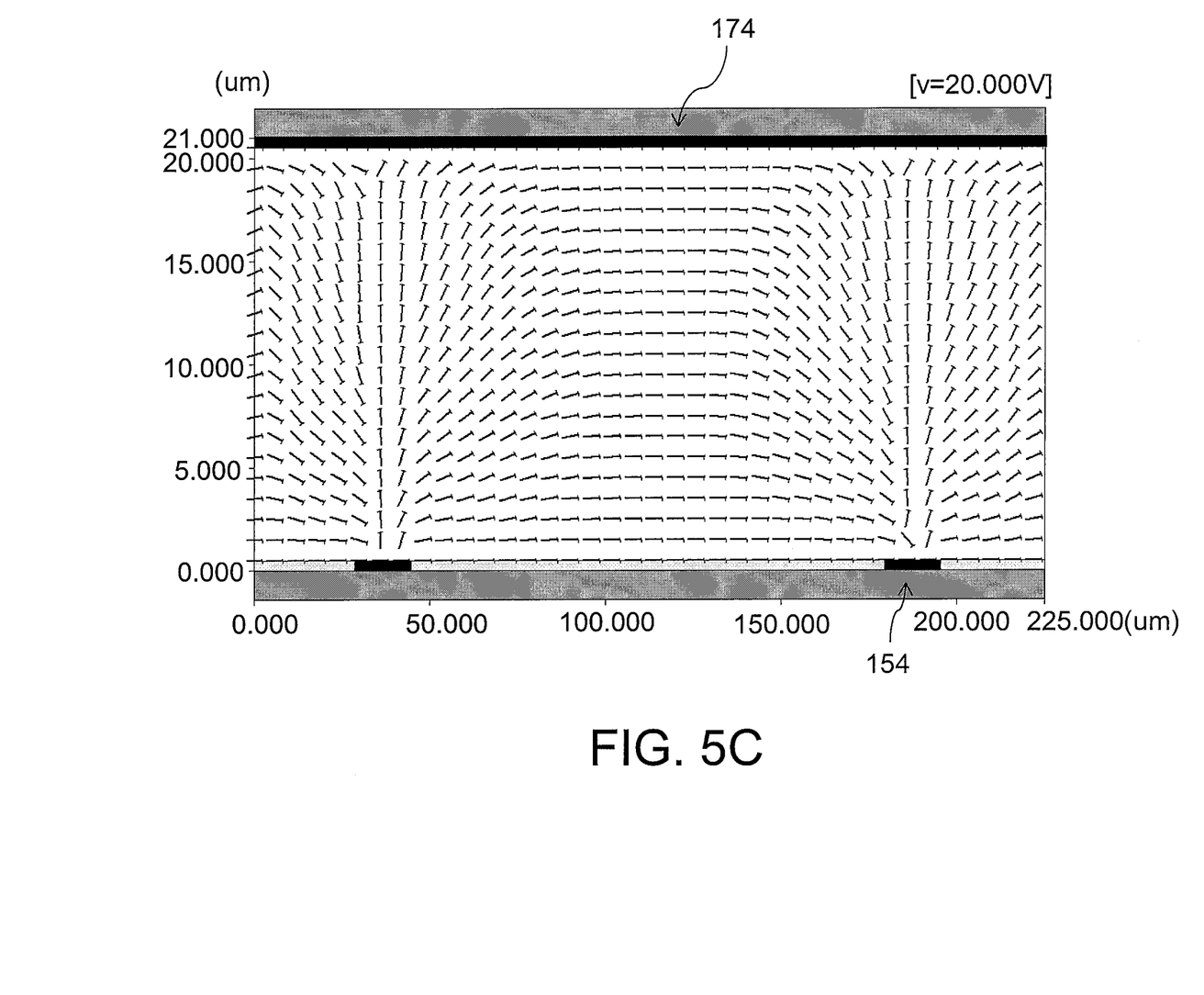
FIG. 5C is a lateral distribution diagram (td direction) of liquid crystal molecules in the region A' in FIG. 5A.

FIG. 2A is a partial schematic diagram of the first electrodes 152 in the peripheral region of FIG. 1B, and FIG. 2B is a lateral and longitudinal distributions diagram of the liquid crystal molecules in a region A in FIG. 2A. FIGS. 5A to 5C illustrate a comparative example, wherein FIG. 5A is a partial schematic diagram of the electrode in the peripheral region in the comparative example in which an extending direction D of an electrode E in the peripheral region is different from an alignment direction P of an alignment layer. For example, the two directions are perpendicular to each other. FIGS. 5B and 5C are respectively a longitudinal (vd direction) and a lateral (td direction) distribution diagram of the liquid crystals in a region A' in FIG. 5A. Referring simultaneously to FIGS. 1B and 2A, in the embodiment, the first electrode layer 150 includes a plurality of the first electrodes 152 and the first connecting electrode 159, wherein the extending portions 156a and 156b of the first electrodes 152 located in the peripheral region and connected with the first connecting electrode 159 are designed to have the extending direction D2 substantially identical to the alignment direction P1 of the alignment layer 140. As shown in FIG. 2B, the liquid crystal molecules correspondingly disposed in the region A where the extending portions 156a and 156b are located have a regular liquid crystal axial distribution in the longitudinal and lateral directions. On the contrary, when the extending direction of the electrode E in the peripheral region is different from the alignment direction of the alignment layer, the distribution of liquid crystals (as shown in FIG. 5B) caused by an electric field created by the electrode E in the non-effective region in the peripheral makes the liquid crystal molecules within the effective region distribute disorderly in the lateral direction. Namely, the distribution of liquid crystal molecules in the non-effective region leans toward the effective region gradually like dominos, disrupting the distribution of liquid crystal molecules in the effective region and altering an originally excellent variation of a liquid crystal refractive index in the lateral direction. This is to say, the first electrodes 152 in the embodiment is designed to avoid the influence of a peripheral electrode on the interior liquid crystal distribution, in order to prevent the phenomenon of disorderly distribution of liquid crystals and make the liquid crystal layer 130 have a desired refractive index distribution. Thereby, the electrically-driven liquid crystal lens panel 100 of the embodiment has a preferable lens effect.

In the embodiment, the first electrode layer 150 includes a plurality of the first electrodes 152, each of the first electrodes 152 has the main portion 154 and the extending portions 156a and 156b formed by turning the main portion 154. The extending direction D2 of the extending portions 156a and 156b is substantially identical to the alignment direction P1 of the alignment layer 140, enabling the extending portions 156a and 156b of the first electrodes 152 to avoid a peripheral electrode (such as the first connecting electrode 159) from influencing the interior liquid crystal distribution, in order to prevent the phenomenon of disorderly liquid crystal distribution. Therefore, the first electrodes 152 include the effective region 150a defined by the main portions 154 and the non-effective region 150b defined by the extending portions 156a and 156b, wherein the non-effective region 150b substantially corresponds to the peripheral region. Accordingly, the influence of the peripheral electrode on the interior liquid crystal distribution is eliminated to prevent the phenomenon of disorderly liquid crystal distribution, making the liquid crystal layer have the desired refractive index distribution. Therefore, the electrically-driven liquid crystal lens panel 100 has a preferable lens effect.

Figure 3:
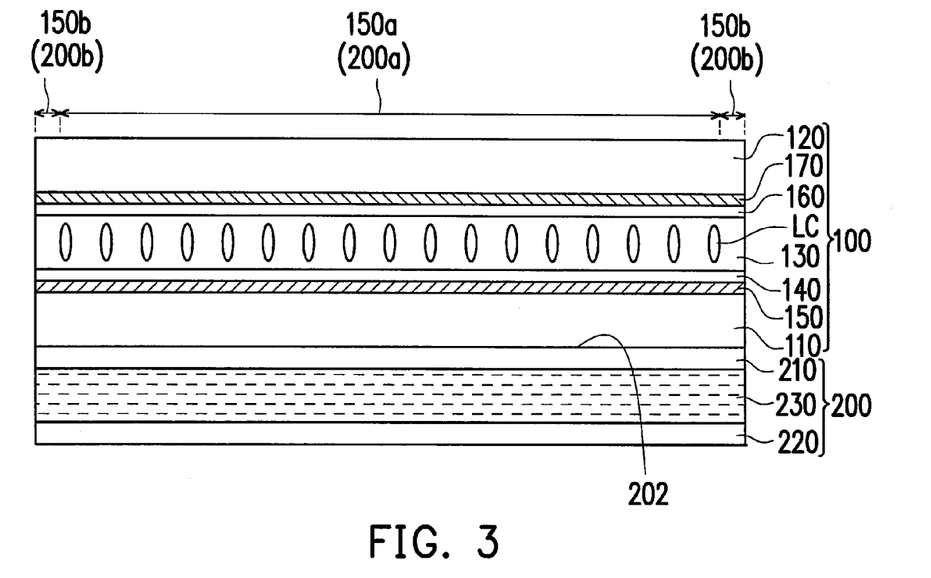
FIG. 3 is a cross-sectional schematic diagram of a stereoscopic display panel according to an embodiment of the disclosure.

FIG. 3 is a cross-sectional schematic diagram illustrating a stereoscopic display panel according to an embodiment of the disclosure. Referring to FIG. 3, a stereoscopic display panel 300 includes a display panel 200 and the electrically-driven liquid crystal lens panel 100. The display panel 200 has a display region 200a and a peripheral region 200b. Generally, the display panel 200 includes, for example, a pair of substrates 210 and 220, and a display medium layer 230 being disposed between the pair of substrates 210 and 220 and located in the display region 200a. Therein, a material of the substrates 210 and 220 may be selected from the above-mentioned substrate materials or other suitable materials. The display region 200a has at least two sub-pixel regions (not shown), each of the sub-pixel regions has at least one transistor, and each of the transistors is electrically connected with a pixel electrode and signal lines (including a data line and a scan line) respectively. The display panel 200 may be any element that displays images, and according to a self-light-emitting material and a non-self-light-emitting material of the display medium layer 230 in the display panel 200, the display panel 200 may be classified into a non-self-light-emitting display panel including a liquid crystal display panel (such as a horizontal electric-field-driven display panel, a vertical electric-field-driven display panel, a blue-phase liquid crystal display panel, a fringe electric-field-driven display panel or other suitable display panels), an electrophoretic display panel, an electro-wetting display panel, an electro-powder display panel or other suitable display panels, and the self-light-emitting display panels including an organic electroluminescent display panel, a plasma display panel, a field-emissive display panel or other types of display panels. When the display panel 200 adopts a non-self-light-emitting material as a display medium, the stereoscopic display panel 300 may further selectively include a light-source module in order to provide a light source needed for display.

The electrically-driven liquid crystal lens panel 100 is disposed on one side of the display panel 200. In the embodiment, a display section 202 of the display panel 200 faces toward the electrically-driven liquid crystal lens panel 100. Namely, the electrically-driven liquid crystal lens panel 100 is disposed above the display panel 200. Accordingly, the display panel 200 can have an effect of stereoscopic display actuated by the electrically-driven liquid crystal lens panel 100. More specifically, with the configuration, light emitted from the display panel 200 is refracted by the electrically-driven liquid crystal lens panel 100, forms a left light path projecting to the left eye and a right light path projecting to the right eye, and thus enables human eyes to see a stereoscopic image. The detailed structure of the electrically-driven liquid crystal lens panel 100 has been described in the above embodiments. The following description only focuses on illustrating the relationship between the electrically-driven liquid crystal lens panel 100 and the display panel 200.

The first electrode layer 150 of the electrically-driven liquid crystal lens panel 100 has the first effective region 150a and the first non-effective region 150b, wherein the first effective region 150a and the display region 200a are disposed correspondingly, and the first non-effective region 150b and the peripheral region 200b are disposed correspondingly. The first electrode layer 150 includes at least two first electrodes 152, each of the first electrodes 152 has the first main portion 154, the first extending portion 156a and the first turning point 158a. The connecting line 150c formed by connecting the first turning points 158a is the boundary between the first effective region 150a and the first non-effective region 150b. The first main portions 154 are located in the first effective region 150a, and the first extending portions 156a are located in the first non-effective region 150b.

Figure 4:
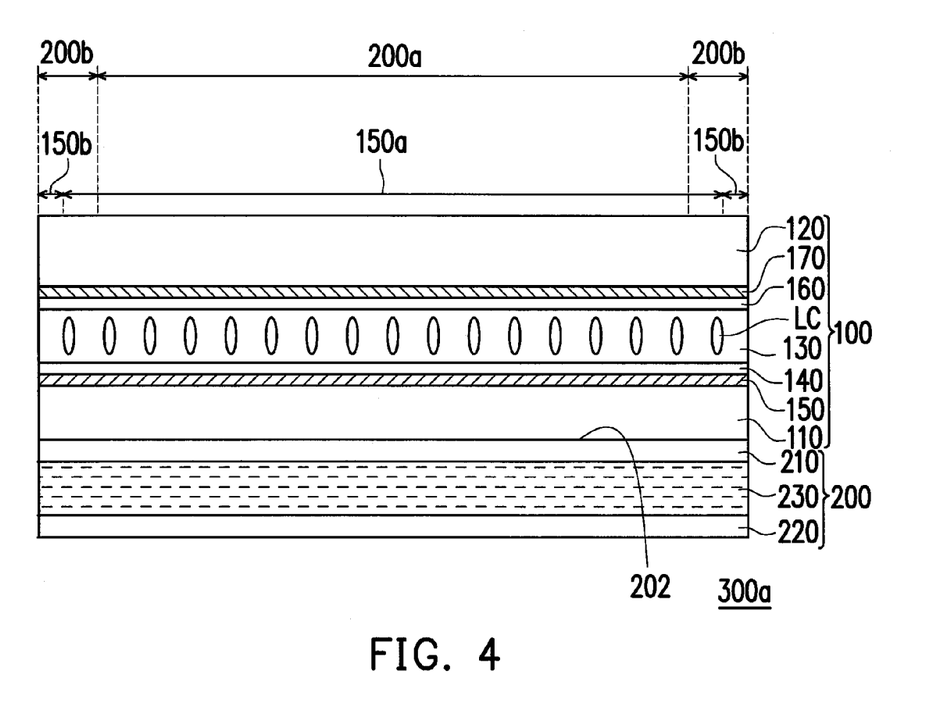
FIG. 4 is a cross-sectional schematic diagram of a stereoscopic display panel according to an embodiment of the disclosure.

In the embodiment, the connecting line 150c formed by connecting of the first turning points 158a and served as the boundary between the first effective region 150a and the first non-effective region 150b substantially overlaps with (or aligns with) a boundary 200c between the display region 200a and the peripheral region 200b. In a stereoscopic display panel 300a of another embodiment, as shown in FIG. 4, the connecting line 150c formed by connecting the first turning points 158a, which serves as the boundary between the first effective region 150a and the first non-effective region 150b, is located in the peripheral region 200b of the display panel 200. This is to say, the first main portions 154 of the first electrodes 152 may be completely disposed in the display region 200a of the display panel 200, or disposed in the display region 200a and the peripheral region 200b, and the extending portions 156a and 156b of the first electrodes 152 are disposed in the peripheral region 200b of the display panel 200. Therefore, the extending portions 156a and 156b of the first electrodes 152 are, for example, shielded by, for example, a frame of a backlight module (not shown), a black matrix in the display panel (not shown), or an opaque component disposed in the peripheral region 200a by the above two elements. Furthermore, in the embodiment, the electrically-driven liquid crystal lens panel 100 and the display panel 200 both preferably take two pairs of substrates that can be easily manufactured as examples, but the disclosure is not limited thereto. In other embodiments, one of the substrates at a joint point of the electrically-driven liquid crystal lens panel 100 and the display panel 200 may be omitted. For instance, the first substrate 110 of the electrically-driven liquid crystal lens panel 100 or the substrate 210 of the display panel 200 may be omitted. Namely, the first substrate 110 is configured as a common substrate, interior and exterior surfaces of the substrate 110 simultaneously serving as elements of the electrically-driven liquid crystal lens panel 100 and the display panel 200, or the substrate 210 of the display panel 200 is configured as the common substrate, the interior and exterior surfaces of the substrate 210 serving as elements of the electrically-driven liquid crystal lens panel 100 and the display panel 200 simultaneously.

In the embodiment, since the first electrode layer 150 in the electrically-driven liquid crystal lens panel 100 eliminates the influence of the peripheral electrode on the interior liquid crystal distribution, in order to prevent the phenomenon of disorderly liquid crystal distribution and make the liquid crystal layer have the desired distribution of refractive index. Thereby, the electrically-driven liquid crystal lens panel 100 has a preferable lens effect. Accordingly, the stereoscopic panel 300 that adopts the electrically-driven liquid crystal lens panel 100 has a preferable stereoscopic display quality, and has a function of switching between a plane display mode and a stereoscopic display mode through driving of the electrically-driven liquid crystal lens panel 100.

In summary, in the electrically-driven liquid crystal lens panel of the disclosure, the first electrode layer includes a plurality of the first electrodes, and each of the first electrodes has the main portion and the extending portion formed by turning the main portion. The extending direction of the extending portions is substantially identical to the alignment direction of the alignment layer, in order to eliminate the influence of the peripheral electrode on the interior liquid crystal distribution, and to further prevent the phenomenon of disorderly liquid crystal distribution and make the liquid crystal layer have the desired distribution of refractive index. Accordingly, the electrically-driven liquid crystal lens panel has a preferable lens effect, and the stereoscopic display panel that adopts the electrically-driven liquid crystal lens panel has a preferable display quality.

Although the disclosure has been disclosed by the above embodiments, the embodiments are not intended to limit the disclosure. It will be apparent to those of ordinary skill in the art that modifications and variations to the disclosure may be made without departing from the spirit and the scope of the disclosure. Accordingly, the protection scope of the disclosure falls in the appended claims.

What is claimed is:

1. An electrically-driven liquid crystal lens panel, comprising:
    a first substrate;
    a second substrate, disposed opposite to the first substrate;
    a liquid crystal layer, disposed between the first substrate and the second substrate;
    a first alignment layer, disposed between the first substrate and the liquid crystal layer, the first alignment layer having a first alignment direction to align liquid crystal molecules of the liquid crystal layer;
    a first electrode layer, disposed between the first alignment layer and the first substrate, having a first effective region and a first non-effective region, and the first electrode layer comprising at least two first electrodes, each of the first electrodes having a first main portion, a first extending portion, and a first turning point, the first turning points being located at sites at which the first main portions and the first extending portions connect, the first main portions extending along a first extending direction and the first main portions being substantially parallel to each other, each of the first extending portions extending along a second extending direction, the second extending direction being different from the first extending direction, and the second extending direction being substantially parallel to the first alignment direction, wherein a first connecting line formed by connecting the first turning points is a boundary between the first effective region and the first non-effective region, the first main portions being located in the first effective region, and the first extending portions being located in the first non-effective region;
    a second alignment layer, disposed between the second substrate and the liquid crystal layer; and
    a second electrode layer, disposed between the second alignment layer and the second substrate.

2. The electrically-driven liquid crystal lens panel according to claim 1, wherein there is an included angle between the first extending direction of each of the first electrodes and the first alignment direction, and the included angles are substantially equal to each other.

3. The electrically-driven liquid crystal lens panel according to claim 1, wherein each of the first electrodes further comprises a second extending portion and a second turning point, the first extending portions and the second extending portions being respectively connected with one end of the first main portions, the second turning points being located at sites at which the first main portions and the second extending portions connect, each of the second extending portions extending along the second extending direction, the first connecting line formed by connecting the first turning points and the second turning points serving as the boundary between the first effective region and the first non-effective region, and the first extending portions and the second extending portions being located in the first non-effective region.

4. The electrically-driven liquid crystal lens panel according to claim 3, wherein the first electrode layer further comprises a first connection electrode, one end of the first extending portions being connected with the first main portions, the other end of the first extending portions being connected with the first connection electrode, one end of the second extending portions being connected with the first main portions, and the other end of the second extending portions being connected with the first connection electrode.

5. The electrically-driven liquid crystal lens panel according to claim 4, wherein the first connection electrode is an annular electrode.

6. The electrically-driven liquid crystal lens panel according to claim 1, wherein the second alignment layer has the first alignment direction.

7. The electrically-driven liquid crystal lens panel according to claim 6, wherein the second electrode layer has a second effective region and a second non-effective region, the second electrode layer comprises at least two second electrodes, and each of the second electrodes has a second main portion, a third extending portion, and a third turning point, the third turning points being located at sites at which the second main portions and the third extending portions connect, the second main portions extending along a third extending direction and the second main portions being substantially parallel to each other, the third extending direction being different from the first extending direction, and each of the third extending portions extending along the second extending direction, wherein a second connecting line formed by connecting the third turning points is a boundary between the second effective region and the second non-effective region, the second main portions are located in the second effective region, and the third extending portions are located in the second non-effective region.

8. The electrically-driven liquid crystal lens panel according to claim 7, wherein the third extending direction substantially intersects with the first extending direction.

9. The electrically-driven liquid crystal lens panel according to claim 7, wherein the second effective region is disposed correspondingly with the first effective region, and the second non-effective region is disposed correspondingly with the first non-effective region.

10. The electrically-driven liquid crystal lens panel according to claim 7, wherein each of the second electrodes further comprises a fourth extending portion and a fourth turning point, the third extending portions and the fourth extending portions being respectively connected with one end of the second main portions, the fourth turning points being located at sites at which the second main portions and the fourth extending portions connect, each of the fourth extending portions extending along the second extending direction, the second connecting line formed by connecting the third turning points and the fourth turning points being the boundary between the second effective region and the second non-effective region, and the third extending portions and the fourth extending portions being located in the second non-effective region.

11. The electrically-driven liquid crystal lens panel according to claim 10, wherein the second electrode layer further comprises a second connection electrode, one end of the third extending portions being connected with the second main portions, the other end of the third extending portions being connected with the second connection electrode, one end of the fourth extending portions being connected with the second main portions, and the other end of the fourth extending portions being connected with the second connection electrode.

12. The electrically-driven liquid crystal lens panel according to claim 11, wherein the second connecting electrode is an annular electrode.

13. A stereoscopic display panel, comprising:
a display panel, having a display region and a peripheral region; and
an electrically-driven liquid crystal lens panel, disposed on one side of the display panel, comprising:
a first substrate;
a second substrate, disposed opposite to the first substrate;
a liquid crystal layer, disposed between the first substrate and the second substrate;
a first alignment layer, disposed between the first substrate and the liquid crystal layer, and the first alignment layer having a first alignment direction to align liquid crystal molecules of the liquid crystal layer;
a first electrode layer, disposed between the first alignment layer and the first substrate, having a first effective region and a first non-effective region, the first electrode layer comprising at least two first electrodes, each of the first electrodes having a first main portion, a first extending portion, and a first turning point, the first turning points being located at sites at which the first main portions and the first extending portions connect, the first main portions extending along a first extending direction and the first main portions being parallel to each other, each of the first extending portions extending along a second extending direction, the second extending direction being different from the first extending direction, and the second extending direction being parallel to the first alignment direction, wherein a connecting line formed by connecting the first turning points is a boundary between the first effective region and the first non-effective region, the first main portions are located in the first effective region, and the first extending portions are located in the first non-effective region, wherein the first effective region is disposed correspondingly with the display region, and the first non-effective region is disposed correspondingly with the peripheral region;
a second alignment layer, disposed between the second substrate and the liquid crystal layer; and
a second electrode layer, disposed between the second alignment layer and the second substrate.

14. The stereoscopic display panel according to claim 13, wherein the connecting line formed by connecting the first turning points and served as the boundary between the first effective region and the first non-effective region substantially overlaps with a boundary between the display region and the peripheral region.

15. The stereoscopic display panel according to claim 13, wherein the connecting line formed by connecting the first turning points and served as the boundary between the first effective region and the first non-effective region is located in the peripheral region of the display panel.

* * * * *